United States Patent
Park et al.

(10) Patent No.: US 10,562,531 B2
(45) Date of Patent: Feb. 18, 2020

(54) ADAPTIVE CRUISE CONTROL APPARATUS AND METHOD THEREOF

(71) Applicant: HYUNDAI MOTOR COMPANY, Seoul (KR)

(72) Inventors: Min Woo Park, Suwon-si (KR); Jin Hyuk Choi, Miryang-si (KR); Yong Cheon Na, Seoul (KR); Won Seok Lee, Seongnam-si (KR); Tae Gon Park, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/499,345

(22) Filed: Apr. 27, 2017

(65) Prior Publication Data

US 2017/0313312 A1   Nov. 2, 2017

(30) Foreign Application Priority Data

Apr. 28, 2016 (KR) .......... 10-2016-0052434
Apr. 27, 2017 (KR) .......... 10-2017-0054284

(51) Int. Cl.
*B60W 30/165* (2012.01)
*B60W 40/072* (2012.01)
*G06K 9/00* (2006.01)

(52) U.S. Cl.
CPC ........ *B60W 30/165* (2013.01); *B60W 40/072* (2013.01); *G06K 9/00798* (2013.01); *G06K 9/00825* (2013.01); *B60W 2420/42* (2013.01)

(58) Field of Classification Search
None
See application file for complete search history.

(56) References Cited

U.S. PATENT DOCUMENTS

| | | | |
|---|---|---|---|
| 2009/0164109 A1* | 6/2009 | Maruyama ............ | B60W 30/16 701/116 |
| 2010/0082251 A1* | 4/2010 | Kogure ............... | B60T 8/17558 701/301 |
| 2015/0151750 A1* | 6/2015 | Tsuchiya ............... | B60W 30/09 701/41 |
| 2017/0329000 A1* | 11/2017 | Masui ................... | B60W 30/16 |

FOREIGN PATENT DOCUMENTS

| KR | 10-2013-0094558 A | 8/2013 |
|---|---|---|
| KR | 10-2014-0025151 A | 3/2014 |
| KR | 10-2014-0076866 A | 6/2014 |
| KR | 10-2014-0143986 A | 12/2014 |
| KR | 10-2016-0004115 A | 1/2016 |

OTHER PUBLICATIONS

Korean Office Action dated Oct. 10, 2018 issued in Korean Patent Application No. 10-2017-0054284.

* cited by examiner

*Primary Examiner* — Lail A Kleinman
(74) *Attorney, Agent, or Firm* — Morgan, Lewis & Bockius LLP (57) ABSTRACT

Disclosed are an adaptive cruise control apparatus and an adaptive cruise control method using the same. An adaptive cruise control apparatus comprises an image acquisition device for acquiring image data in front of a subject vehicle; and a processor configured to detect presence of a forward vehicle using the image data; obtain information on the forward vehicle by using information on the presence of the forward vehicle and the image data; and predict a trajectory and speed of the subject vehicle using the information on the forward vehicle.

16 Claims, 9 Drawing Sheets

REAR SYMMETRY AXIS

ADAPTIVE CRUISE CONTROL APPARATUS AND METHOD THEREOF

CROSS-REFERENCE TO RELATED APPLICATION

This application claims the benefit of priority to Korean Patent Applications No. 10-2016-0052434 filed on Apr. 28, 2016, and Korean Patent Application No. 10-2017-0054284 filed on Apr. 27, 2017, in the Korean Intellectual Property Office (KIPO), the entire contents of which are hereby incorporated by this reference.

TECHNICAL FIELD

The present disclosure relates to an adaptive cruise control apparatus and a method for the same, and more particularly, to an adaptive cruise control apparatus applicable in curved lanes such as steep curves, and an operation method of the same.

BACKGROUND

When an obstacle appears suddenly in front of a vehicle, it is necessary to prevent the vehicle from colliding with the obstacle by operating the brake and decelerating the vehicle. However, when the driver does not recognize the obstacle inadvertently, the vehicle may collide with the obstacle.

An adaptive cruise control (ACC) which may also be referred to as a smart cruise control is a function to prevent collision with a preceding vehicle ahead. The ACC system detects a forward vehicle and adjusts a speed of a subject vehicle equipped with the ACC system according to a distance between the forward vehicle and the subject vehicle. Specifically, the forward vehicle is detected through a sensor mounted on the front of the subject vehicle, a distance to the detected forward vehicle is measured, and a collision with the forward vehicle is prevented by adjusting the speed of the subject vehicle.

In a typical ACC apparatus mounted on the subject vehicle, an object located in the forward direction of the subject vehicle among objects detected within a certain forward range through a radar in front of the vehicle is assumed to be the forward vehicle, a distance between the subject vehicle and the forward vehicle is calculated, and only the speed of the subject vehicle is controlled based on the calculated distance.

However, since such the conventional ACC apparatus may fail to detect a forward vehicle present in the front lane in a steep curve state, or may recognize a vehicle travelling in a side lane as a forward vehicle, there is a problem that it is difficult to track a forward vehicle properly.

SUMMARY

Accordingly, exemplary embodiments of the present disclosure are provided to substantially obviate one or more problems due to limitations and disadvantages of the related art.

Exemplary embodiments of the present disclosure also provide an adaptive cruise control apparatus and a method capable of stably tracking a forward vehicle even in a low-speed steep curve, through recognition of lanes, detection of the forward vehicle in the lanes, and estimation of a distance to the forward vehicle and a travelling direction of the forward vehicle.

In order to achieve the above-described objective, an aspect of the present disclosure may provide an adaptive cruise control apparatus comprising an image acquisition device for acquiring image data in front of a subject vehicle; and a processor configured to: detect presence of a forward vehicle using the image data; obtain information on the forward vehicle by using information on the presence of the forward vehicle and the image data; and predict a trajectory and speed of the subject vehicle using the information on the forward vehicle.

The processor may be further configured to control a speed and direction of the subject vehicle based on the trajectory and speed of the subject vehicle.

The processor may be further configured to calculate a distance between the forward vehicle and the subject vehicle; and estimate a traveling direction of the forward vehicle.

The processor may be further configured to recognize lanes along which the subject vehicle travels by using the image data; and identify the forward vehicle in the recognized lanes.

The processor may be further configured to calculate a curvature of the recognized lanes.

The processor may estimate the travelling direction of the forward vehicle by using a rear symmetry axis which is a vertical axis at a center of a rear of the forward vehicle.

The processor may estimate the travelling direction of the forward vehicle by using a first distance indicating a distance from the rear symmetry axis to a leftmost side of the forward vehicle and a second distance indicating a distance from the rear symmetry axis to a rightmost side of the forward vehicle The processor may estimate the travelling direction of the forward vehicle by using a difference between the first distance and the second distance.

The processor may determine that the forward vehicle advances straight when a value obtained by subtracting the second distance from the first distance is zero, determine that the travelling direction of the forward vehicle is a left-turn direction when the value is greater than zero, and determine that the travelling direction of the forward vehicle is a right-turn direction when the value is less than zero.

The processor may calculate an angle of the travelling direction of the forward vehicle by using the first distance and the second distance after estimating the travelling direction of the forward vehicle.

In order to achieve the above-described objective, another aspect of the present disclosure may provide an adaptive cruise control method comprising acquiring image data in front of a subject vehicle; detecting presence of a forward vehicle using the image data; obtaining information on the forward vehicle by using information on the presence of the forward vehicle and the image data; and predicting a trajectory and speed of the subject vehicle using the information on the forward vehicle.

The adaptive cruise control method may further comprise controlling a speed and direction of the subject vehicle based on the predicted trajectory and speed of the subject vehicle.

The obtaining information on the forward vehicle may further comprise calculating a distance between the forward vehicle and the subject vehicle; and estimating a traveling direction of the forward vehicle.

The detecting presence of a forward vehicle may comprise recognizing lanes along which the subject vehicle travels by using the image data; and identifying the forward vehicle in the recognized lanes.

The obtaining information on the forward vehicle may further comprise calculating a curvature of the recognized lanes.

The traveling direction of the forward vehicle may be estimated using a rear symmetry axis which is a vertical axis at a center of a rear of the forward vehicle.

The travelling direction of the forward vehicle may be estimated using a first distance indicating a distance from the rear symmetry axis to a leftmost side of the forward vehicle and a second distance indicating a distance from the rear symmetry axis to a rightmost side of the forward vehicle.

The travelling direction of the forward vehicle may be estimated using a difference between the first distance and the second distance.

The traveling direction of the forward vehicle may be determined to be straight when a value obtained by subtracting the second distance from the first distance is zero, determined to be a left-turn direction when the value is greater than zero, and determined to be a right-turn direction when the value is less than zero.

The adaptive cruise control method may further comprise calculating an angle of the travelling direction of the forward vehicle by using the first distance and the second distance after estimating the travelling direction of the forward vehicle.

According to embodiments of the present disclosure, provided is an adaptive cruise control apparatus that autonomously follows a forward vehicle of a subject vehicle.

According to embodiments of the present disclosure, provided is an adaptive cruise control apparatus for safely following a forward vehicle even in a low-speed abrupt curve road by estimating a traveling direction of the forward vehicle of the subject vehicle.

According to embodiments of the present disclosure, provided is an adaptive cruise control method for safely following a forward vehicle even in a low-speed abrupt curve road by estimating the traveling direction of the forward vehicle of the subject vehicle.

BRIEF DESCRIPTION OF DRAWINGS

Exemplary embodiments of the present disclosure will become more apparent by describing in detail exemplary embodiments of the present disclosure with reference to the accompanying drawings, in which.

DETAILED DESCRIPTION

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An adaptive cruise control apparatus according to the present disclosure relates to an apparatus making a subject vehicle being capable of tracking a forward vehicle at an appropriate distance by controlling an engine and/or a power transmission apparatus or controlling a brake. According to the present disclosure, the subject vehicle can track the forward vehicle up to a steep curved road with a curve radius of 125 degrees or more.

Hereinafter, preferred embodiments according to the present disclosure will be described in detail with reference to the accompanying drawings.

Figure 1:
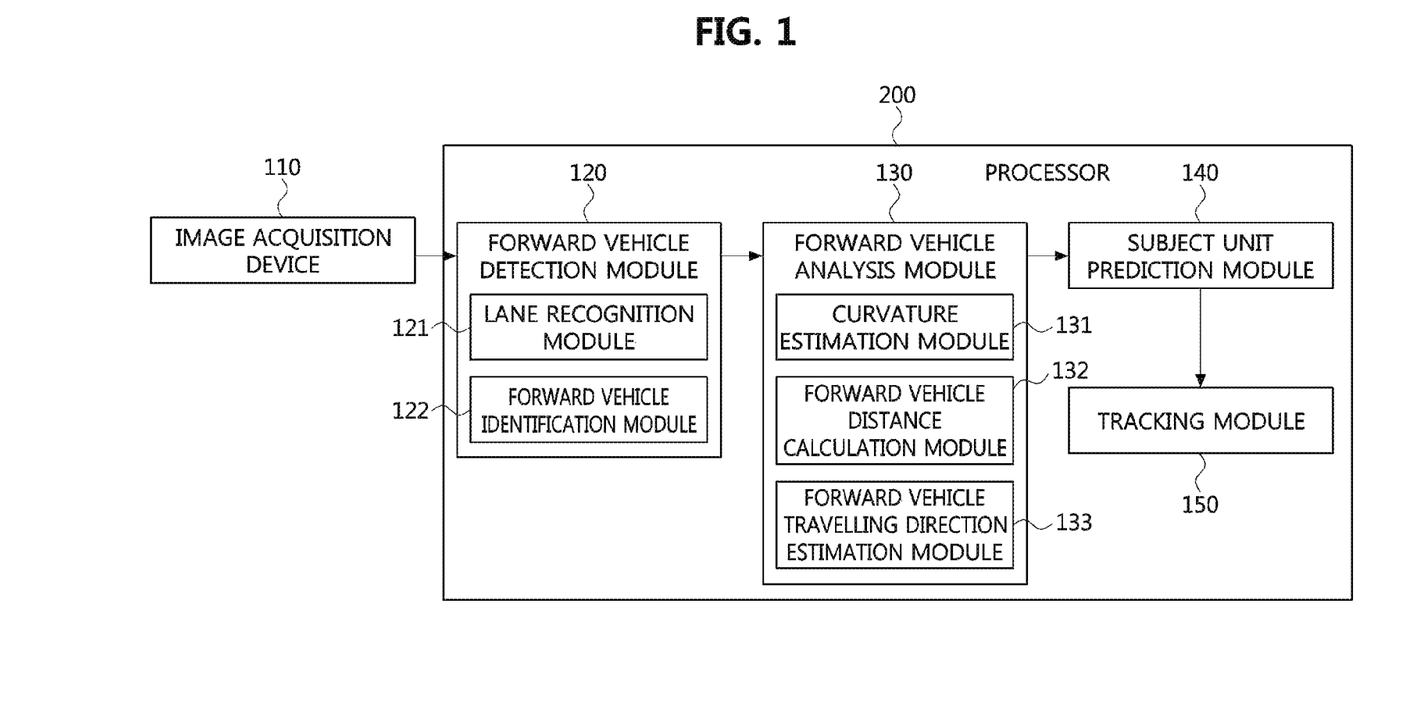
FIG. 1 is a block diagram illustrating an adaptive cruise control apparatus according to an embodiment of the present disclosure.

FIG. 1 is a block diagram illustrating an adaptive cruise control apparatus according to an embodiment of the present disclosure.

Referring to FIG. 1, an adaptive cruise control apparatus according to an embodiment of the present disclosure may comprise an image acquisition device 110 and a processor 200 including a forward vehicle detection module 120, a forward vehicle analysis module 130, a subject vehicle prediction module 140, and a tracking module 150. Here, each of the above components is not limited to its name, but may be defined by a function or a role, and some of the above-described components may perform their functions or roles as integrated into a single entity.

The image acquisition device 110 may acquire image data in front of a subject vehicle. Here, the image acquisition device 110 may comprise a device for obtaining image data such as a camera. The image acquisition device 110 may include a coder and decoder (codec) for compressing or decompressing image data to process the image data. The codec may be a codec capable of processing the image data in a video coding/decoding manner such as MPEG-4 ASP or H.264/MPEG-4 AVC, but is not limited thereto.

A processor 200 performs various functions of following modules 120, 130, 140 and 150. The modules 120, 130, 140 and 150 described below are implemented with software instructions executed on the processor 200.

The forward vehicle detection module 120 may detect a forward vehicle preceding the subject vehicle by using the image data acquired from the image acquisition device 110, and comprise a lane recognition module 121 and a forward vehicle identification module 122. The lane recognition module 121 may recognize lanes 31 and 41 (refer to FIGS. 6 to 9) of the road from the image data acquired by the image acquisition device 110. Here, a super pixel segmentation based lane recognition technique may be used as a method for recognizing the lanes from the image data, but embodiments of the present disclosure are not limited thereto. The forward vehicle identification module 122 may identify whether a forward vehicle exists in the lanes that the subject vehicle drives between.

The forward vehicle analysis module 130 may derive information on the forward vehicle based on the image data of the image acquisition device 110 and the result output by the forward vehicle detection module 120. The forward vehicle analysis module 130 may comprise a curvature estimation module 131, a forward vehicle distance calculation module 132, and a forward vehicle traveling direction estimation module 133.

The curvature estimation module 131 may estimate a curvature of the road, and a method for estimating the curvature may be a conventional method. In a case that the estimated curvature is zero, it may be determined that the road on which the subject vehicle travels is a straight road. In a case that the estimated curvature is greater than zero, it may be determined that the road on which the subject vehicle travels is a curved road. Further, it is possible to determine whether the road on which the subject vehicle travels is a gentle curve or an abrupt curve according to the magnitude of the estimated curvature.

The forward vehicle distance calculation module 132 may calculate a distance between the forward vehicle and the subject vehicle when the forward vehicle of the subject vehicle is detected by the forward vehicle detection module 120. Here, a convention method may be used to calculate the distance between the forward vehicle and the subject vehicle.

The forward vehicle traveling direction estimation module 133 may derive a rear symmetry axis, which is a vertical axis at a center of a rear of the forward vehicle, using the image data of the image acquisition device 110, and estimate the traveling direction of the forward vehicle using the derived rear symmetry axis. Details will be described later with reference to FIGS. 2 to 4.

The subject vehicle prediction module 140 may predict a trajectory and speed of the subject vehicle by using an analysis result of the forward vehicle analysis module 130. The analysis data of the forward vehicle analysis module 130 may include the curvature of the road calculated by the curvature estimation module 131, the distance between the forward vehicle and the subject vehicle calculated by the forward vehicle distance calculation module 132, and the travelling direction of the forward vehicle calculated by the forward vehicle traveling direction estimation module 133.

The tracking module 150 may track the forward vehicle 20 on the straight road, the gentle curved road, and the abrupt curved road according to the trajectory and speed of the subject vehicle predicted by the subject vehicle prediction module 140.

Figure 2:
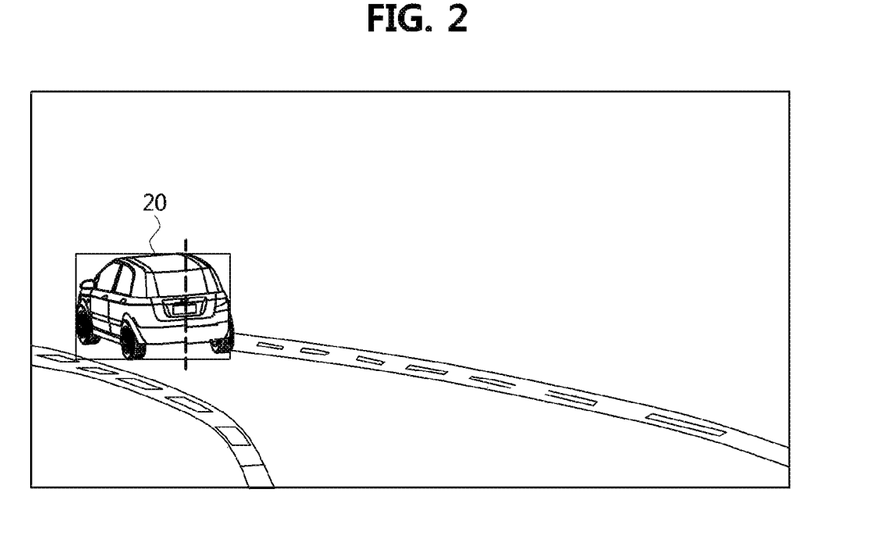
FIG. 2 is a diagram illustrating an actual image of forward vehicle image data according to an embodiment of the present disclosure.

FIG. 2 is a diagram illustrating an actual image of forward vehicle image data according to an embodiment of the present disclosure.

An embodiment of the present disclosure will be described based on the assumption that the traveling direction of a forward vehicle 20 is a left-turn direction. Referring to FIG. 2, the image acquisition device 110 of the adaptive cruise control apparatus according to the present disclosure may acquire image data in front of a subject vehicle 10, and the forward vehicle traveling direction estimation module 133 may use the image data from the image acquisition device 110 to estimate a rear symmetry axis of the forward vehicle 20.

Figure 3:
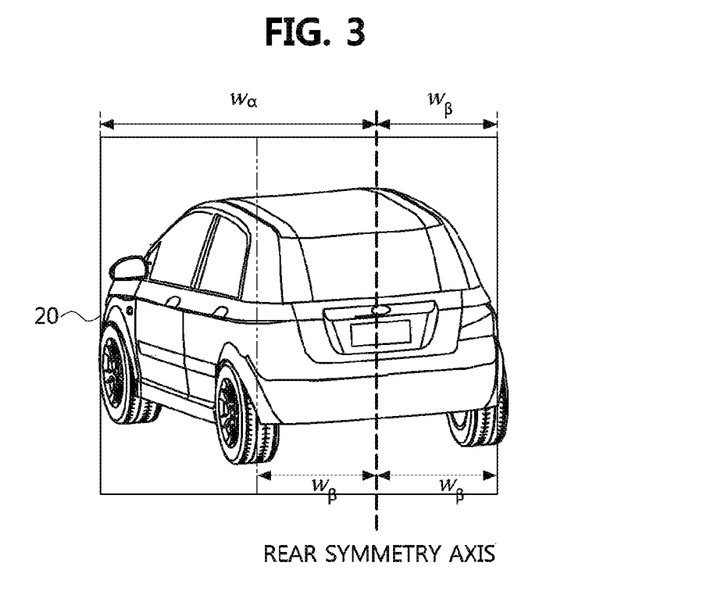
FIG. 3 is a diagram explaining a concept of a rear symmetry axis of a forward vehicle according to an embodiment of the present disclosure.

FIG. 3 is a diagram explaining a concept of a rear symmetry axis of a forward vehicle 20 according to an embodiment of the present disclosure.

Referring to FIG. 3, a distance from the rear symmetry axis to the leftmost side of the forward vehicle 20 may be expressed as $\omega_\alpha$ and a distance from the rear symmetry axis to the rightmost side of the forward vehicle 20 may be expressed as $\omega_\beta$. Then, the forward vehicle travelling direction estimation module 133 may determine the travelling direction of the forward vehicle 20 to be a straight forward direction, a left-turn direction, or a right-turn direction based on a difference between $\omega_\alpha$ and $\omega_\beta$. Specifically, the forward vehicle travelling direction estimation module 133 may estimate the travelling direction of the forward vehicle 20 by using Equation 1.

$$\begin{cases} \text{left,} & \text{if } w_\alpha - w_\beta > 0 \\ \text{Straight,} & \text{if } w_\alpha - w_\beta = 0 \\ \text{Right,} & \text{if } w_\alpha - w_\beta < 0 \end{cases} \quad \text{[Equation 1]}$$

Referring to Equation 1, the forward vehicle travelling direction estimation module 133 may determine the travelling direction of the forward vehicle to be the left-turn direction when the difference between $\omega_\alpha$ and $\omega_\alpha$ is greater than zero, determine the travelling direction of the forward vehicle to be the straight forward direction when the difference between $\omega_\alpha$ and $\omega_\beta$ is zero, and determine the travelling direction of the forward vehicle to be the right-turn direction when the difference between $\omega_\alpha$ and $\omega_\beta$ is less than zero.

Figure 4:
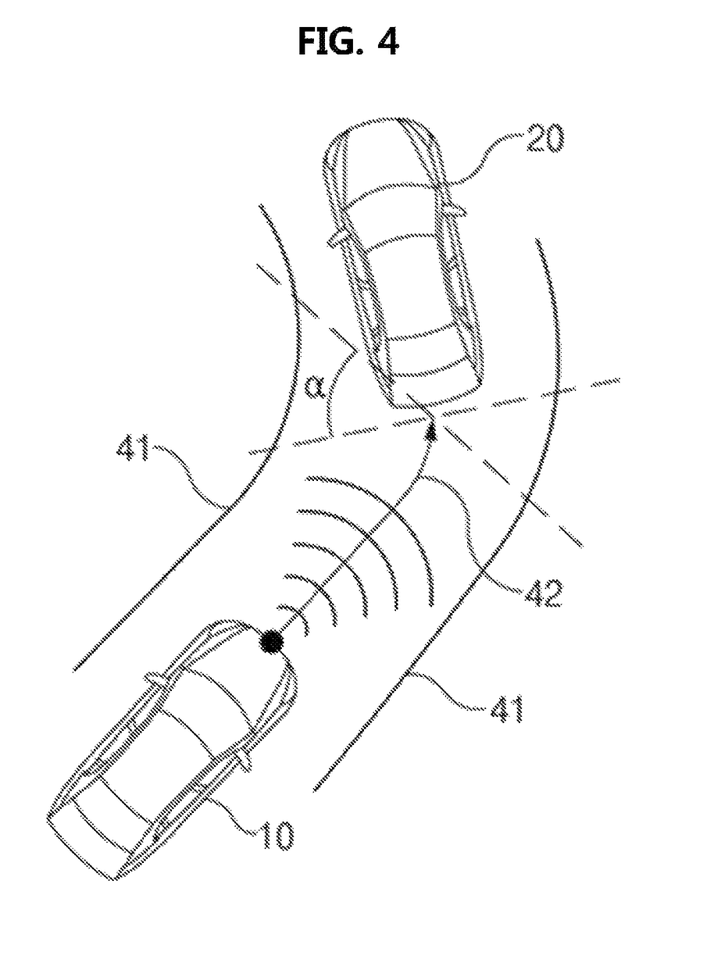
FIG. 4 is a conceptual diagram explaining a method of estimating a travelling direction of a forward vehicle according to an embodiment of the present disclosure.

FIG. 4 is a conceptual diagram explaining a method of estimating a travelling direction of a forward vehicle according to an embodiment of the present disclosure.

Referring to FIG. 4, the forward vehicle traveling direction estimation module 133 may calculate an angle α of the forward vehicle 20 in the left-turn direction when it is determined that the forward vehicle 20 is traveling in the left-turn direction. The forward vehicle traveling direction estimation module 133 may determine whether Equation 2 is satisfied before calculating the angle α of the forward vehicle 20 in the left-turn direction.

$$0 \leq |w_\alpha w_\beta| \leq \omega \cdot 2w_\beta \quad \text{[Equation 2]}$$

In Equation 2, ω may represent an experimental coefficient, and $w_\alpha$ and $w_\beta$ may be equal to those shown in Equation 1. The forward vehicle traveling direction estimation module 133 may calculate the angle α in the left-turn direction of the forward vehicle 20 through Equation 3 when Equation 2 is satisfied.

$$\alpha = \frac{90}{\omega \cdot 2w_\beta} \cdot |w_\alpha - w_\beta| \quad \text{[Equation 3]}$$

In Equation 2, ω, $w_\alpha$ and $w_\beta$ are equal to those shown in Equation 2.

Figure 5:
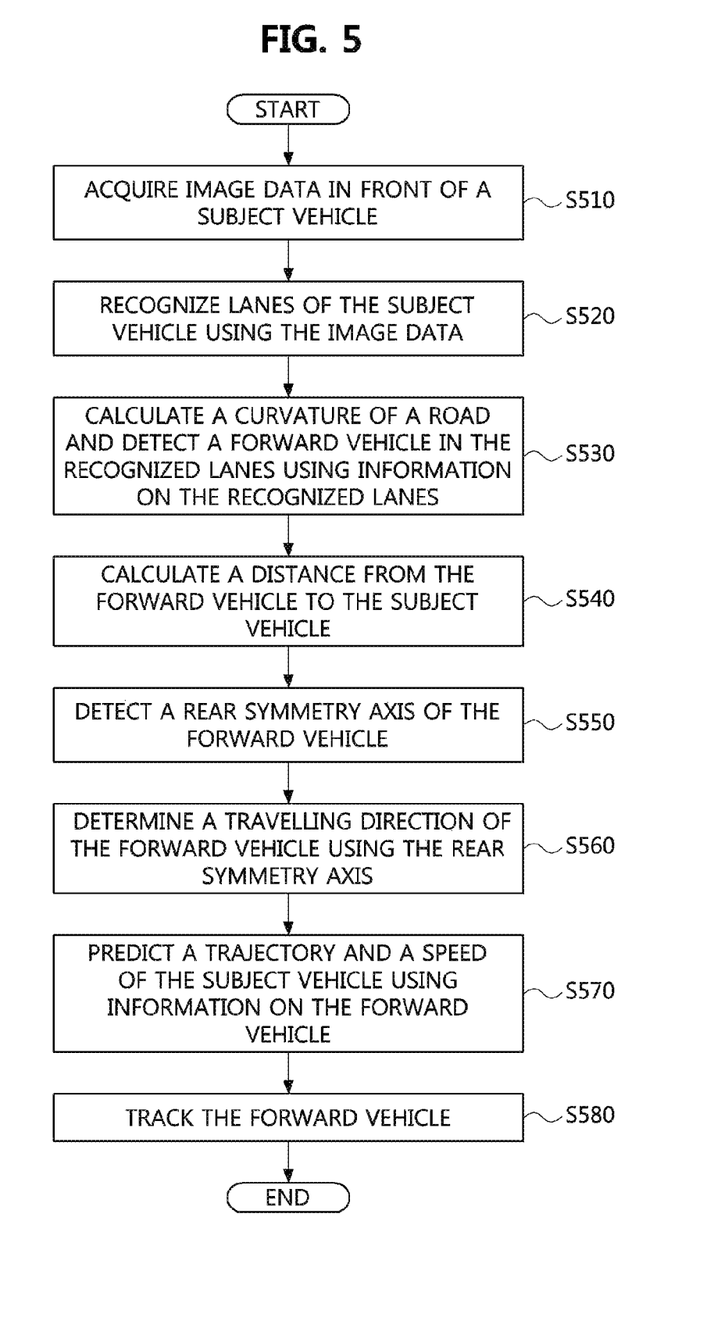
FIG. 5 is a flow chart explaining an adaptive cruise control method according to an embodiment of the present disclosure.

FIG. 5 is a flow chart explaining an adaptive cruise control method according to an embodiment of the present disclosure.

In an adaptive cruise control method according to the present disclosure, the image data in front of the subject vehicle 10 may be acquired (S510), and lanes between which the subject vehicle 10 travels may be recognized based on the image data (S520). The recognized lanes may be used to calculate the curvature of the road, and used to detect presence of the forward vehicle 20 in the recognized lanes (e.g., 31 or 41 in FIGS. 6 to 9) (S530). Also, the distance between the subject vehicle 10 and the forward vehicle 20 may be calculated (S540), and the rear symmetry axis of the forward vehicle 20 may be determined (S550). Then, the travelling direction of the forward vehicle 20 may be determined using the determined rear symmetric axis (S560), and the trajectory and speed of the subject vehicle 10 may be predicted using the information on the forward vehicle 20. The forward vehicle 20 may be tracked according to the predicted trajectory and speed of the subject vehicle 10 (S580).

Figure 6:
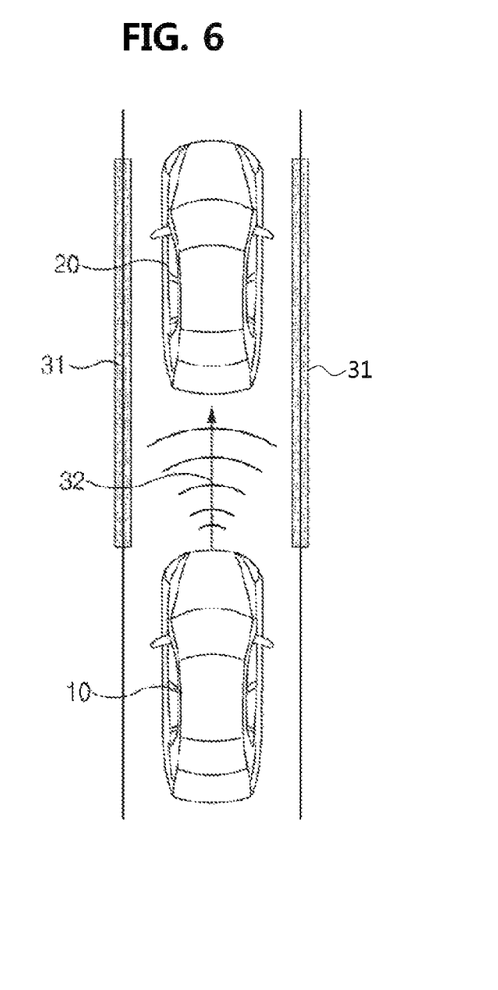
FIG. 6 is a conceptual diagram illustrating an example in which an adaptive cruise control apparatus according to an embodiment recognizes lanes and tracks a forward vehicle in a straight road.

FIG. 6 is a conceptual diagram illustrating an example in which an adaptive cruise control apparatus according to an embodiment recognizes lanes and tracks a forward vehicle in a straight road.

In FIG. 6, it may be assumed that the subject vehicle 10 equipped with an adaptive cruise control apparatus according to an embodiment travels along a straight road. Since the forward vehicle 20 is positioned in front of the straight line of the subject vehicle 10, the rear of the forward vehicle 20 may be easily detected through image data of the image acquisition device 110 and the lanes 31 of the straight road may also be easily recognized.

Figure 7:
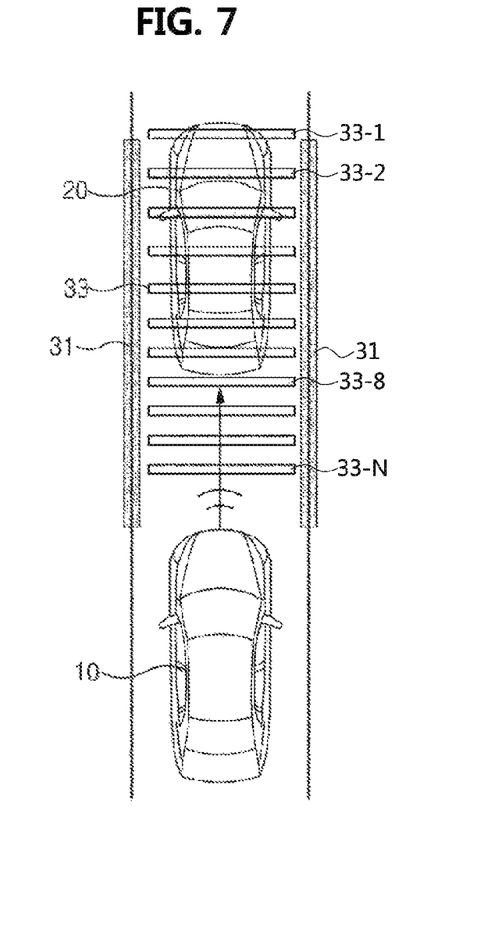
FIG. 7 is a conceptual diagram illustrating an example in which an adaptive cruise control apparatus according to an embodiment calculates a distance to a forward vehicle in a straight road.

FIG. 7 is a conceptual diagram illustrating an example in which an adaptive cruise control apparatus according to an embodiment calculates a distance to a forward vehicle in a straight road.

In order to calculate the distance between the forward vehicle 20 and the subject vehicle 10, virtual lines 33-1 to 33-N may be assumed to be arranged at a predetermined interval in accordance with characteristics of the straight road, and the distance between the forward vehicle 20 and the subject vehicle 10 may be calculated using a virtual line (e.g., 33-8) on which the rear of the forward vehicle 20 is located.

Figure 8:
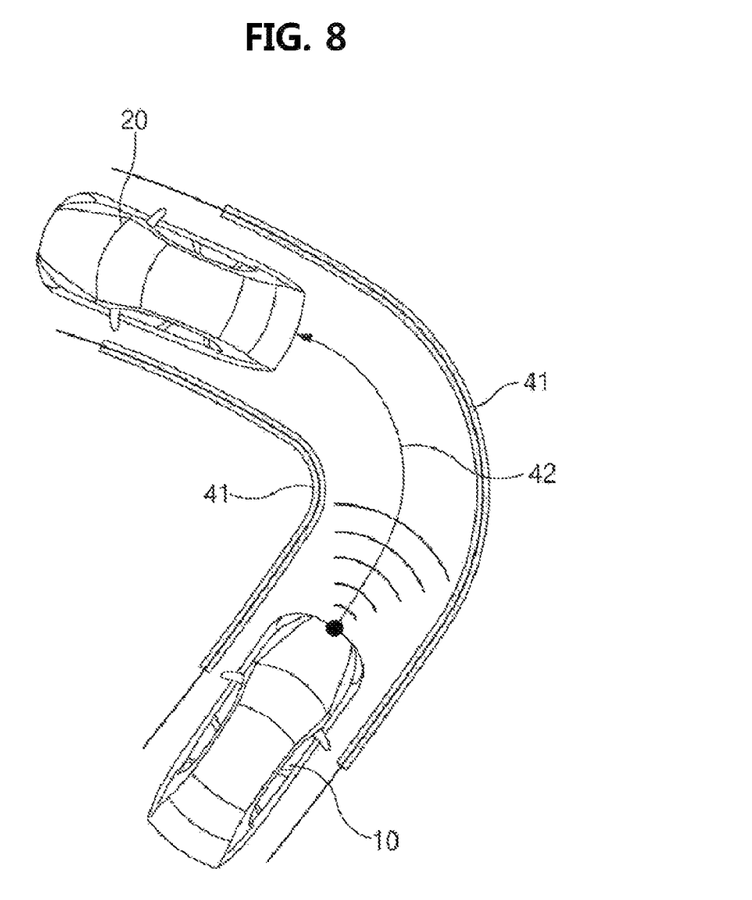
FIG. 8 is a conceptual diagram illustrating an example in which an adaptive cruise control apparatus according to another embodiment recognizes lanes and tracks a forward vehicle in a steep curve.

FIG. 8 is a conceptual diagram illustrating an example in which an adaptive cruise control apparatus according to another embodiment recognizes lanes and tracks a forward vehicle in a steep curve.

In FIG. 8, it may be assumed that the subject vehicle 10 equipped with an adaptive cruise control apparatus according to another embodiment travels on a left-turn road. In the conventional adaptive cruise device, since a sudden curved road may cause a situation in which incorrect lanes are recognized instead of the lanes of the forward vehicle 20, or a situation in which the forward vehicle 20 is lost, the speed of the subject vehicle 10 may suddenly change at a preset speed, and dangerous situation may be confronted.

The adaptive cruise control apparatus according to the present disclosure is capable of estimating the traveling direction of the forward vehicle 20 even when the subject vehicle 10 is located on a steep curve. Thus, even when the forward vehicle 20 passes through the steep curved road and disappears from the front of the subject vehicle 10, the presence of the forward vehicle 20 may be detected in consideration of the steep curved road.

Figure 9:
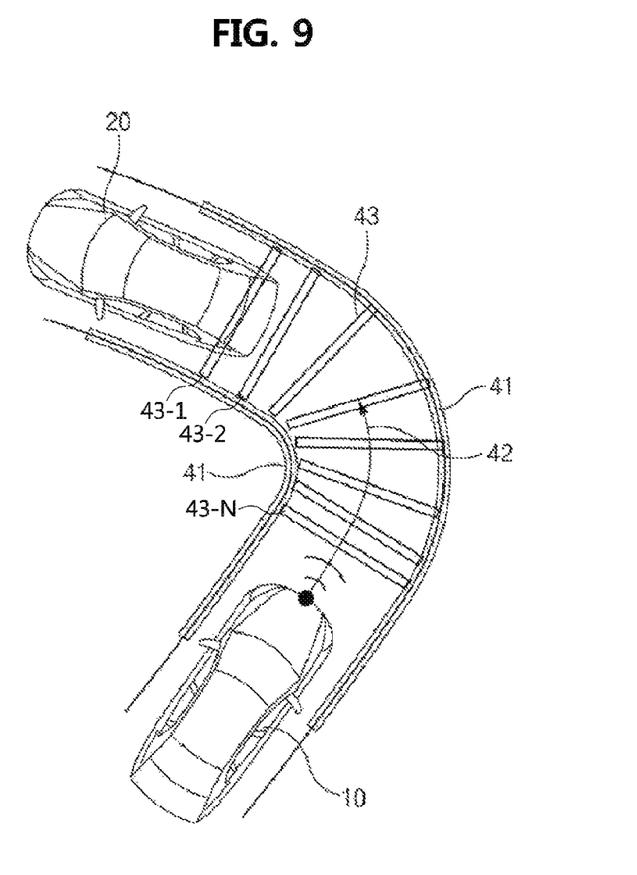
FIG. 9 is a diagram illustrating an example in which an adaptive cruise control apparatus according to another embodiment calculates a distance to a forward vehicle in a steep curve.

FIG. 9 is a diagram illustrating an example in which an adaptive cruise control apparatus according to another embodiment calculates a distance to a forward vehicle in a steep curve.

Since the adaptive cruise control apparatus according to the present disclosure is capable of estimate the curvature of the curved road by recognizing lanes 41 of the curved road, virtual lines 43-1 to 43-N may be assumed to be arranged at a predetermined interval in accordance with the curvature of the curved road, and the distance between the forward vehicle 20 and the subject vehicle 10 may be calculated using a virtual line (e.g., 43-2 which is the closest to the rear of the forward vehicle 20).

Figure 10:
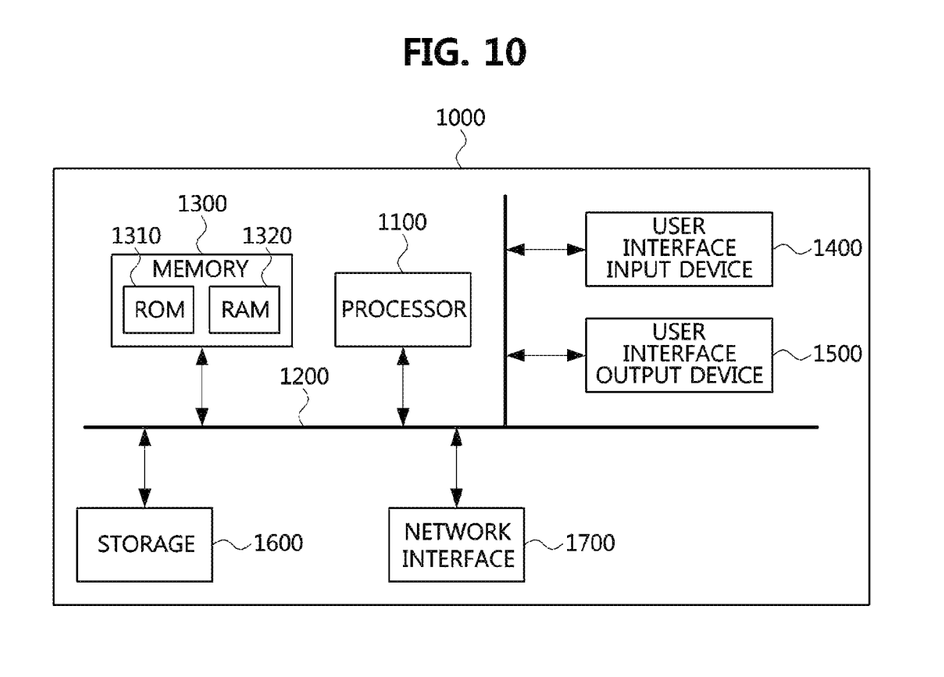
FIG. 10 is a block diagram illustrating a computing apparatus performing an adaptive cruise control method according to an embodiment of the present disclosure.

FIG. 10 is a block diagram illustrating a computing apparatus performing an adaptive cruise control method according to an embodiment of the present disclosure.

Referring to FIG. 10, a computing apparatus 1000 may comprise a processor 1100, a memory 1300, a storage 1600, and a network interface 1700. Also, the computing apparatus 1000 may further comprise a user interface input device 1400 and a user interface output device 1500 as additional components.

The processor 1100 may be a central processing unit (CPU) or any type of semiconductor device that executes instructions stored in the memory 1300 and/or the storage 1600.

The memory 1300 and storage 1600 may include various types of volatile or non-volatile storage media. Here, the memory 1300 may include, but is not limited to, a Read Only Memory (ROM) and a Random Access Memory (RAM).

In connection with embodiments disclosed herein, the steps of a method or algorithm described herein may be embodied directly in hardware, in a software module executed by the processor 1100, or in a combination of hardware and software modules. The software module may be stored in a storage medium (e.g., the memory 1300 and/or the storage 1600) such as a RAM memory, a flash memory, a ROM memory, an EPROM memory, an EEPROM memory, a register, a hard disk, a removable disk, or the like.

The above-described storage medium may be coupled to the processor 1100, and the processor 1100 may read information from the storage medium and input information to the storage medium. In addition, the storage medium may be integral with the processor 1100. The processor 1100 and the storage medium may be mounted in an Application Specific Integrated Circuit (ASIC), and the ASIC may be mounted in the computing apparatus. Alternatively, the processor 1100 and the storage medium may be mounted as discrete components in the computing apparatus.

While embodiments of the present disclosure and their advantages have been described in detail, it should be understood that various changes, substitutions and alterations may be made herein without departing from the scope of the present disclosure.

What is claimed is:

1. An adaptive cruise control apparatus comprising:
an image acquisition device for acquiring image data in front of a subject vehicle; and
a processor configured to:
    detect presence of a forward vehicle using the image data;
    obtain information on the forward vehicle by using information on the presence of the forward vehicle and the image data; and
    predict a trajectory and a speed of the subject vehicle using the information on the forward vehicle,
wherein the forward vehicle is present in a lane in which the subject vehicle is traveling,
wherein the information on the forward vehicle includes a distance between the forward vehicle and the subject vehicle,
wherein the distance is calculated based on predetermined interval information, and wherein the processor is further configured to determine whether a traveling direction of the forward vehicle is a left-turn direction, aright-turn direction, or a straight direction by using a distance from a rear symmetry axis at a center of a rear side of the forward vehicle to a leftmost side or a rightmost side of the forward vehicle.

2. The adaptive cruise control apparatus of claim 1, wherein the processor is further configured to control a speed and a direction of the subject vehicle based on the predicted trajectory and the predicted speed of the subject vehicle.

3. The adaptive cruise control apparatus of claim 1, wherein the processor is further configured to:
    recognize the lane by using the image data; and
    identify the forward vehicle based on the lane.

4. The adaptive cruise control apparatus of claim 3, wherein the processor is further configured to calculate a curvature of the lane.

5. The adaptive cruise control apparatus of claim 1, wherein the processor estimates the travelling direction of the forward vehicle by using a first distance from the rear symmetry axis to the leftmost side of the forward vehicle and a second distance from the rear symmetry axis to the rightmost side of the forward vehicle.

6. The adaptive cruise control apparatus of claim 5, wherein the processor estimates the travelling direction of the forward vehicle by using a difference between the first distance and the second distance.

7. The adaptive cruise control apparatus of claim 1, wherein the processor determines that the forward vehicle advances straight when a value obtained by subtracting the second distance from the first distance is zero, determines that the travelling direction of the forward vehicle is the left-turn direction when the value is greater than zero, and determines that the travelling direction of the forward vehicle is the right-turn direction when the value is less than zero.

8. The adaptive cruise control apparatus of claim 1, wherein the processor calculates an angle of the travelling direction of the forward vehicle by using the first distance and the second distance after estimating the travelling direction of the forward vehicle.

9. An adaptive cruise control method comprising:
acquiring, by an image acquisition device, image data in front of a subject vehicle;
detecting, by a processor, presence of a forward vehicle using the image data;
obtaining, by a processor, information on the forward vehicle by using information on the presence of the forward vehicle and the image data; and
predicting, by a processor, a trajectory and a speed of the subject vehicle using the information on the forward vehicle,
wherein the forward vehicle is present in a lane in which the subject vehicle is traveling,
wherein the information on the forward vehicle includes a distance between the forward vehicle and the subject vehicle,
wherein the distance is calculated based on predetermined interval information, and
wherein the obtaining information on the forward vehicle further comprises determining whether a traveling direction of the forward vehicle is a left-turn direction, a right-turn direction, or a straight direction by using a distance from a rear symmetry axis at a center of a rear side of the forward vehicle to a leftmost side or a rightmost side of the forward vehicle.

10. The adaptive cruise control method of claim 9, further comprising controlling a speed and a direction of the subject vehicle based on the predicted trajectory and the predicted speed of the subject vehicle.

11. The adaptive cruise control method of claim 9, wherein the detecting presence of a forward vehicle comprises:
    recognizing the lane by using the image data; and
    identifying the forward vehicle based on the lane.

12. The adaptive cruise control method of claim 9, wherein the obtaining information on the forward vehicle comprises calculating a curvature of the lane.

13. The adaptive cruise control method of claim 9, wherein the travelling direction of the forward vehicle is estimated using a first distance from the rear symmetry axis to leftmost side of the forward vehicle and a second distance from the rear symmetry axis to rightmost side of the forward vehicle.

14. The adaptive cruise control method of claim 13, wherein the travelling direction of the forward vehicle is estimated using a difference between the first distance and the second distance.

15. The adaptive cruise control method of claim 14, wherein the traveling direction of the forward vehicle is determined to be straight when a value obtained by subtracting the second distance from the first distance is zero, determined to be the left-turn direction when the value is greater than zero, and determined to be the right-turn direction when the value is less than zero.

16. The adaptive cruise control method of claim 13, further comprising calculating an angle of the travelling direction of the forward vehicle by using the first distance and the second distance after estimating the travelling direction of the forward vehicle.

* * * * *